United States Patent
Yu et al.

(10) Patent No.: US 11,459,891 B2
(45) Date of Patent: Oct. 4, 2022

(54) ROTARY ENGINE

(71) Applicant: LG ELECTRONICS INC., Seoul (KR)

(72) Inventors: Byeonghun Yu, Seoul (KR); Gunyoung Park, Seoul (KR); Sooho Jang, Seoul (KR); Yunhi Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/921,120

(22) Filed: Jul. 6, 2020

(65) Prior Publication Data

US 2021/0003011 A1    Jan. 7, 2021

(30) Foreign Application Priority Data

Jul. 4, 2019  (KR) ........................ 10-2019-0080595

(51) Int. Cl.
*F01C 21/04* (2006.01)
*F02B 55/08* (2006.01)
*F01C 1/22* (2006.01)
*F01C 19/12* (2006.01)

(52) U.S. Cl.
CPC .............. *F01C 21/04* (2013.01); *F01C 1/22* (2013.01); *F01C 19/12* (2013.01); *F02B 55/08* (2013.01)

(58) Field of Classification Search
CPC .......... F02B 55/08; F02B 53/00; F02B 55/02; F02B 2053/005; F01M 11/02; F01M 1/02; F01M 5/002; F01C 21/04

USPC ....... 418/97–100, 85; 123/18 A, 18 R, 43 A, 123/45 A, 200–249

See application file for complete search history.

(56) References Cited

U.S. PATENT DOCUMENTS

| | | | | |
|---|---|---|---|---|
| 2,522,824 A * | 9/1950 | Hicks | .................. | F01C 21/0809 418/99 |
| 3,245,386 A * | 4/1966 | Bentele | .................. | F01C 19/04 418/99 |
| 3,771,903 A * | 11/1973 | King | ........................ | F01C 21/04 418/84 |
| 3,809,021 A * | 5/1974 | Lamm | ..................... | F02B 53/00 123/208 |
| 3,811,806 A * | 5/1974 | King | ........................ | F01M 9/12 418/100 |
| 3,814,555 A * | 6/1974 | Casey | ..................... | F01C 21/04 418/99 |

(Continued)

FOREIGN PATENT DOCUMENTS

| | | | | |
|---|---|---|---|---|
| GB | 1382387 A | * | 1/1975 | ............. F01C 21/04 |
| JP | 62-18302 | | 2/1987 | |

(Continued)

OTHER PUBLICATIONS

Korean Office Action issued in Application No. 10-2019-0080595 dated May 19, 2020.

*Primary Examiner* — J. Todd Newton, Esq.
(74) *Attorney, Agent, or Firm* — Ked & Associates, LLP

(57) ABSTRACT

Disclosed herein is a rotary engine a supply flow passage provided in the housing to allow the lubricating oil to move therethrough, a sealing part arranged to contact the rotor to selectively close the supply flow passage, and an elastic part configured to press the sealing part toward the combustion chamber.

19 Claims, 6 Drawing Sheets

(56) References Cited

U.S. PATENT DOCUMENTS

| | | | | | |
|---|---|---|---|---|---|
| 3,844,691 | A | * | 10/1974 | Dobler | F01M 11/00 418/97 |
| 3,913,706 | A | * | 10/1975 | Ernest | F01C 21/04 184/6.5 |
| 3,923,435 | A | * | 12/1975 | Jones | F01C 21/04 418/100 |
| 3,941,524 | A | * | 3/1976 | Huf | F01C 19/00 418/99 |
| 4,106,169 | A | * | 8/1978 | Gibson | F01C 9/005 29/445 |
| 4,345,885 | A | * | 8/1982 | Turner | F01C 21/04 418/90 |
| 4,390,330 | A | * | 6/1983 | Kodama | F01C 21/04 184/6.26 |
| 4,463,718 | A | * | 8/1984 | Griffith | F01C 21/045 123/242 |
| 4,765,291 | A | * | 8/1988 | Kurio | F02B 53/00 123/196 R |
| 2014/0261291 | A1 | * | 9/2014 | Garside | F01C 21/06 123/200 |
| 2018/0057185 | A1 | * | 3/2018 | Cathcart | F02M 37/025 |

FOREIGN PATENT DOCUMENTS

| | | |
|---|---|---|
| JP | 2008-150989 | 7/2008 |
| JP | 2017-044078 | 3/2017 |
| KR | 10-2018-0120524 | 11/2018 |
| KR | 20180120524 A * | 11/2018 |

* cited by examiner

ROTARY ENGINE

CROSS-REFERENCE TO RELATED APPLICATION(S)

This application claims the benefit of Korean Patent Application No. 10-2019-0080595, filed in Korea on Jul. 4, 2019, which is hereby incorporated by reference as if fully set forth herein.

BACKGROUND

1. Field

The present disclosure relates to a rotary engine.

2. Background

Generally, a rotary engine refers to an engine configured to generate power by rotational motion. The rotary engine may have a simple structure compared to the piston engine, and accordingly it is easy to miniaturize the rotary engine. In addition, since the rotary engine may be capable of continuous combustion stroke, the rotary engine may produce high output power with low displacement. Further, since the rotary engine may provide uniform rotational force, the rotary engine may produce less vibration and noise and less nitrogen oxide emissions than the piston engine. Rotary engines have recently been applied not only to automobiles, bicycles, aircraft, and jet skis as main engines due to the advantages they have, but also to a compressor of a heat pump system due to their simple structure.

FIGS. 1A-1C show structures of a rotary engine and lubrication oil supply device according to related art. Referring to FIG. 1A, a rotary engine may include a housing 100 having an epitrochoidal curve shape and a triangular rotor 200 inscribed therein. The housing 100 may corresponds=to a cylinder, and the rotor 200 may serve as a piston.

The housing 100 may accommodate the rotor 200. The housing 100 may further include a rotor housing 130 configured to define a combustion chamber provided with an epitrochoidal curve, a first housing 110 coupled to close one surface of the rotor housing 130, a second housing 120 provided to close the opposite surface of the rotor housing 130, an intake part or port 140 provided to inject fuel into the housing 100, and an exhaust part or port 150 provided to discharge the burned fuel from the housing 100.

In the rotary engine, there may be three spaces between the housing 100 and the rotor 200, and the volume of each of the spaces may be changed from moment to moment by rotation of the rotor 200. When one surface of the rotor 200 opens an intake port or fuel intake 140, a fuel F is injected into the housing 100 through the intake port 140 (Intake stroke). The fuel F injected into the housing 100 may be compressed while moving along the inner circumferential surface of the housing 100 in the direction of rotation of the rotor 200 (Compression stroke). When the fuel F reaches the vicinity of an ignition device, the ignition device may generate a spark or the like to explode or combust the fuel F (Explosion stroke). The rotor 200 may be rotated by rotational power transmitted thereto by the exploded fuel to open the exhaust port 150 to discharge the burned fuel F (Exhaust stroke). In this way, the rotary engine completes a four-stroke cycle of intake, compression, explosion, and exhaust during one rotation of the rotor 200.

The rotary engine does not require valves for intake and compression because the intake port 140 and exhaust port 150 are opened and closed by rotation of the rotor 200 of the rotary engine. In addition, the rotary engine does not have a crank. Accordingly, the rotary engine may be designed to have a compact size.

Since the rotor 200 rotates while rubbing the inner circumferential surface of the rotor housing 130, the rotor 200 and the rotor housing 130 need to be lubricated. Therefore, the rotary engine may further include a lubricating oil supply device configured to supply oil to the rotor housing 130.

FIG. 1B shows a rotary engine oil supply device disclosed in Japanese Patent Application Publication No. 2008-150989. Referring to FIG. 1B, the rotary engine is provided with a through hole 113 in the rotor housing 130 and at least one side supply nozzle 550 installed in the through hole 113.

When a single side supply nozzle 550 is provided, the oil may not be uniformly supplied to the entire area of contact between the rotor 200 and the rotor housing 130. Accordingly, the rotary engine may be provided with multiple side supply nozzles 550 to supply oil evenly and effectively to the contact surfaces of the rotor 200 and the rotor housing 130. However, the installation cost and the volume occupied by the side supply nozzles 550 may be increased. When a single side supply nozzle 550 is provided, a lubricating effect may be impaired.

Moreover, an oil pump configured to selectively supply oil to the side supply nozzle 550 may be provided. The volume of the oil pump may be very large compared to the side supply nozzle 550. Accordingly, with the oil pump, the size of the rotary engine may not be reduced.

Referring to FIG. 1C, to address this issue, a rotary engine to supply oil to either the first housing 110 or the second housing 120 is disclosed in Japanese Patent Application Publication No. 2017-044078. In this rotary engine, an oil supply device 560 may be provided to supply oil through a supply flow passage 113 embedded in a side surface of the housing 110 or 120. Thus, the rotary engine has a reduced volume and may evenly supply oil to the inner circumferential surface of the rotor housing 130. Moreover, as the supply flow passage 113 is opened and closed using the rotor 200 without a separate pump for the oil supply device 560, the need for a pump is eliminated.

However, the oil supply device 560 shown in FIG. 1(c) may supply an excessive amount of oil because there is no means to open and close the supply flow passage 113 other than the rotor 200, and oil may be continuously supplied in all states where the end of the oil supply device 560 is separated from the rotor 200.

The excessively supplied oil not only cools the engine, but also interferes with combustion of the fuel, and causes the energy of the fuel to be used for the combustion of the oil, impairing efficiency of the engine. Therefore, the rotary engines of the related art have a limitation in stably supplying a proper amount of oil while achieving a compact size.

The above references are incorporated by reference herein where appropriate for appropriate teachings of additional or alternative details, features and/or technical background.

BRIEF DESCRIPTION OF THE DRAWINGS

Embodiments will be described in detail with reference to the following drawings in which like reference numerals refer to like elements, and wherein.

DETAILED DESCRIPTION

Figure 2:
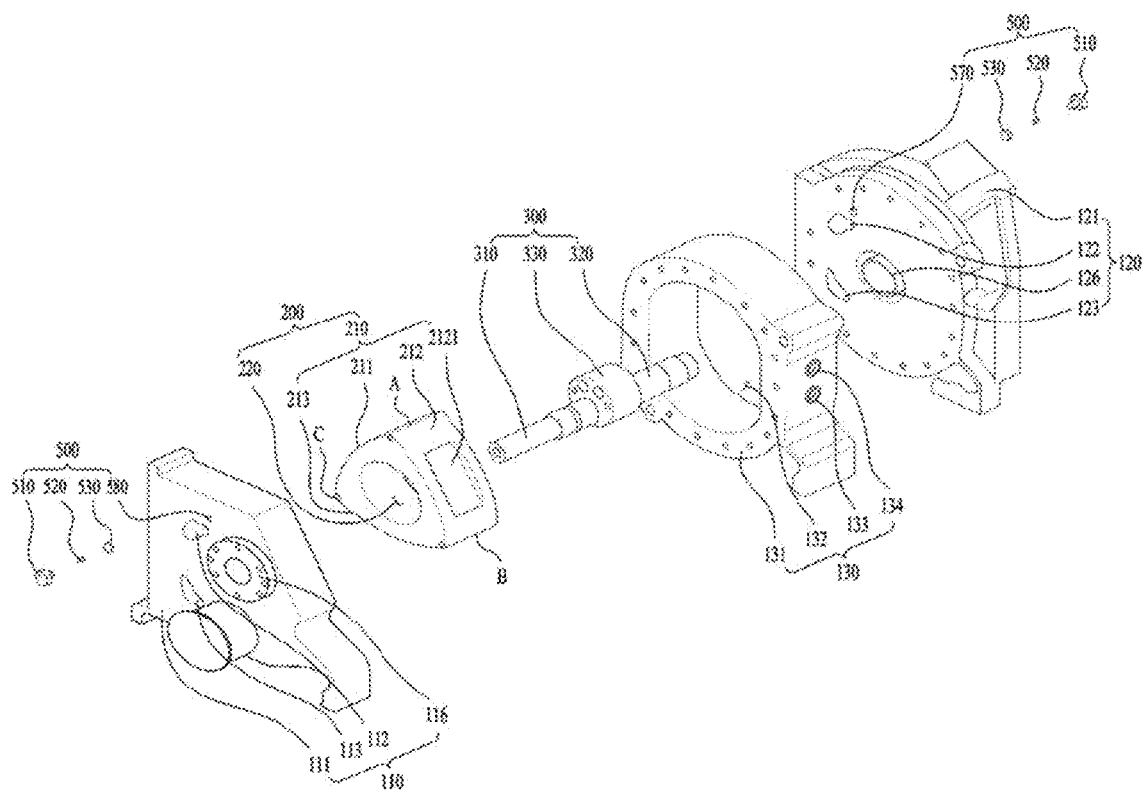
FIG. 2 shows a structure of a rotary engine according to an embodiment of the present disclosure.

FIG. 2 shows the structure of a rotary engine according to the present disclosure. Referring to FIG. 2, the rotary engine of the present disclosure may include a housing 100 having a combustion chamber 132 in which fuel is combusted, a supply flow passage through which lubricating oil is supplied to the combustion chamber 132, and a rotor 200 eccentrically rotatably provided in the combustion chamber 132 to move or compress the fuel. The rotor 200 may be lubricated with the lubricating oil.

The housing 100 may include a rotor housing 130 configured to accommodate or receive the rotor 200. The rotor housing 130 may be brought into contact with an outer circumferential surface of the rotor 200. The housing 100 may further include a first housing or cover 110 coupled to one or a first surface of the rotor housing 130 to seal the combustion chamber 132. The housing 100 may further include a second housing or cover 120 coupled to another or second surface of the rotor housing 130 opposite to and facing the first surface of the rotor housing to seal the combustion chamber 132.

The rotor housing 130 may include an accommodation body or rotor case 131 configured to accommodate the rotor 200 with the rotor 200 inscribed therein. The accommodation body 131 may be hollow so as to be formed with the combustion chamber 132 to receive the rotor 200 and/or combust fuel. The accommodation body 131 may define a side surface (e.g., a circumferential side surface) of the combustion chamber 132, and have front and rear openings that are covered by the first and second housings 110 and 120, respectively.

The rotor housing 130 may include insertion holes 133 and 134 into which an igniter or ignition device is inserted. The igniter may be configured to perform an explosion or combustion stroke by igniting the fuel compressed by the rotor 200 Multiple igniters may be provided, and the insertion hole may include a first insertion hole 133 and a second insertion hole 134 spaced apart from the first insertion hole 113 in a direction opposite or perpendicular to the rotation direction of the rotor 200. The rotor housing 130 may have a thickness or depth corresponding to the thickness of the rotor 200, where thickness is in an axial direction of the rotor 200 or a direction connecting the first and second housings 110 and 120

Figure 1A:
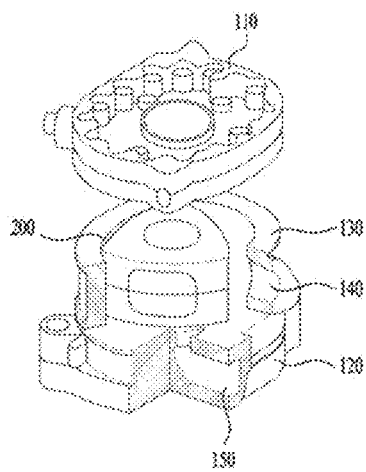
FIGS. 1A-1C show structure of a rotary engine according to related art.
Figure 1B:
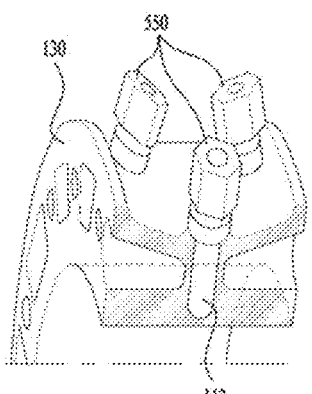
Figure 1C:
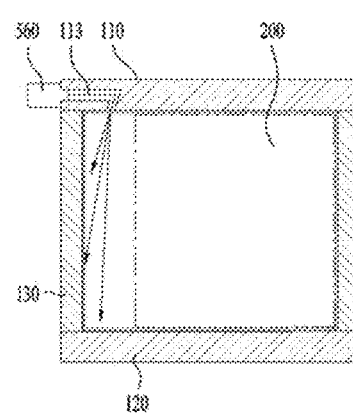

The rotary engine may include an intake part or port (similar to the intake port 140 of FIG. 1) provided to supply fuel to the combustion chamber 132 and an exhaust part or port (similar to the exhaust port 150 of FIG. 1) provided to discharge the combusted fuel of the combustion chamber 132. The fuel may be a mixture with air. The intake part 140 may communicate with the rotor housing 130. However, in order to improve a flame propagation efficiency of the fuel, the intake part 140 may be configured to communicate with one of the first housing 110 and the second housing 120 to supply fuel to both sides of the rotor 200 irrespective of the rotational direction of the rotor 200 or in an inclined direction.

The first housing 110 may include a first housing body or frame 111 coupled to the rotor housing 130 to define one or a front surface of the combustion chamber 132. The first housing body 111 may close or cover the front opening of the accommodation body 131. A first intake hole 112 may be formed through the first housing body 111 to communicate with the intake port.

The second housing 120 may include a second housing body or frame 121 coupled to the rotor housing 130 to face the first housing 110 and/or a rear of the rotor housing 130 and define another or rear surface of the combustion chamber 132 that is opposite to the front surface. The second housing body 121 may close or cover the rear opening of the accommodation body 131. A second intake hole 122 may be formed through the second housing body 121 to communicate with the intake port.

The first intake hole 112 and the second intake hole 122 may be provided to be biased to one side (e.g., a left side) of the first housing body 111 and the second housing body 121. Fuel may be injected into a space defined between an outer circumferential surface of the rotor 200 and an inner circumferential surface of the rotor housing 130.

The exhaust port may be configured to communicate with at least one of the first housing 110 or the second housing 120. The first housing 110 may include a first exhaust hole 113 formed through the first housing body 111 to communicate with the exhaust port, and the second housing 120 may include a second exhaust hole 123 formed through the second housing body 121 to communicate with the exhaust port. The first exhaust hole 113 and the second exhaust hole 123 may be provided to be biased toward one side (e.g., the left side) of the first housing body 111 and the second the housing body 121 to be on the same side that the first intake hole 112 and the second intake hole 122 are provided. The combusted fuel may be discharged as the rotor 200 completes almost one rotation.

The first exhaust hole 113 and the second exhaust hole 123 may be arranged to be spaced apart from the first intake hole 112 and the second intake hole 122 in a direction counter to a rotation of the rotor 200, respectively. Any distance of spacing is sufficient as long as the intake fuel and the exhausted fuel are prevented from being mixed with each other. The first exhaust hole 113 and the second exhaust hole 123 may be provided to face each other.

A rotating or rotation shaft 300 may rotate the rotor 200. The first housing 110 and the second housing 120 may each include a support or shaft hole through which the rotation shaft 300 may be arranged or rotatably supported. The first housing 110 may include a first support or shaft hole 116 through which the rotating shaft 300 may be provided or by which one end of the rotating shaft 300 may be received and supported. The second housing 120 may include a second support or shaft hole 126 through which the rotation shaft 300 may be provided or by which the opposite end of the rotating shaft 300 may be received and supported.

The rotor 200 may include a rotor body 210 provided to compress or move the fuel, and a through hole 220 formed through the rotor body 210 to allow the rotating shaft 300 to be coupled thereto. The through hole 220 may be formed to be larger than a diameter of the rotating shaft 300. The through hole 220 may be provided with an inner circumferential gear 225 (FIG. 7) configured to engage with an outer circumferential gear provided around the rotating shaft 230.

The rotor 200 is provided in the combustion chamber 232 to eccentrically rotate to move the fuel sucked or suctioned through the intake port along the inner circumferential surface of the rotor housing 130 or to compress the fuel by pushing the fuel toward the rotor housing 130.

The rotor 200 may include a corner or edge configured to make surface contact or line contact with the rotor housing 130 to partition the combustion chamber 132. Hereinafter, it is assumed that the rotor 200 has a triangular cross-section, but this is for illustration only. The rotor 200 may be described in the same principle even when the cross-section thereof is circular or elliptical.

In the case of a triangular rotor 200, the rotor 200 may have a triangular cross-section to partition the combustion chamber 132 into three parts. The rotor 200 may include a first compression surface 211 defining one surface of the outer circumferential surface of the rotor 200, a second compression surface 212 formed at an end of the first compression surface 211 to define another surface of the outer circumferential surface of the rotor 200, and a third compression surface 213 formed at an end of the second compression surface 212 to define another surface of the outer circumferential surface of the rotor 200.

In addition, the rotor 200 may have three corners or corner edges. The first compression surface 211 and the second compression surface 212 may share a first corner or corner edge A, and the second compression surface 212 and the third compression surface 213 may share a second corner or corner edge B. The third compression surface 213 and the first compression surface 211 may share a third corner or corner edge C.

The first corner A, the second corner B, and the third corner C may move in surface contact with the rotor housing 130 whenever the rotor 200 rotates. Accordingly, the first corner A, the second corner B, and the third corner C may divide the combustion chamber 132 into three parts.

The first corner A, the second corner B, and the third corner C may make surface contact with the rotor housing 130 to partition the combustion chamber 132. However, there is a concern that the divided spaces may communicate with each other. In other words, the sucked fuel may move to another space through a space or gap between any one of the first corner A, the second corner B, and the third corner C and the inner circumferential surface of the rotor housing 130.

To prevent such movement, the first corner A, the second corner B, and the third corner C may each include a side seal or a corner seal brought into close contact with the rotor housing 130. The side seal or corner seal may be formed of a different material from the rotor 200.

The first compression surface 211, the second compression surface 212, and the third compression surface 213 may each may include a groove or recess 2121. There may be a first groove 2121 formed in the first compression surface 211, a second groove 2121 formed in the second compression surface 212, and a third groove 2121 formed in the third compression surface 213. The first, second, and third grooves 2121 may be depressed inward to accommodate fuel or receive a reaction force when fuel explodes.

The rotating shaft 300 may include a first shaft 310 coupled to the first housing 110, a second shaft 320 coupled to the second housing 120, and an eccentric shaft 330 connecting the first shaft 310 and the second shaft 320 and eccentrically arranged or biased to one side of the rotation center of the first shaft 310 and the second shaft 320. The first shaft 310 and the second shaft 320 may have the same rotation center.

Figure 7:
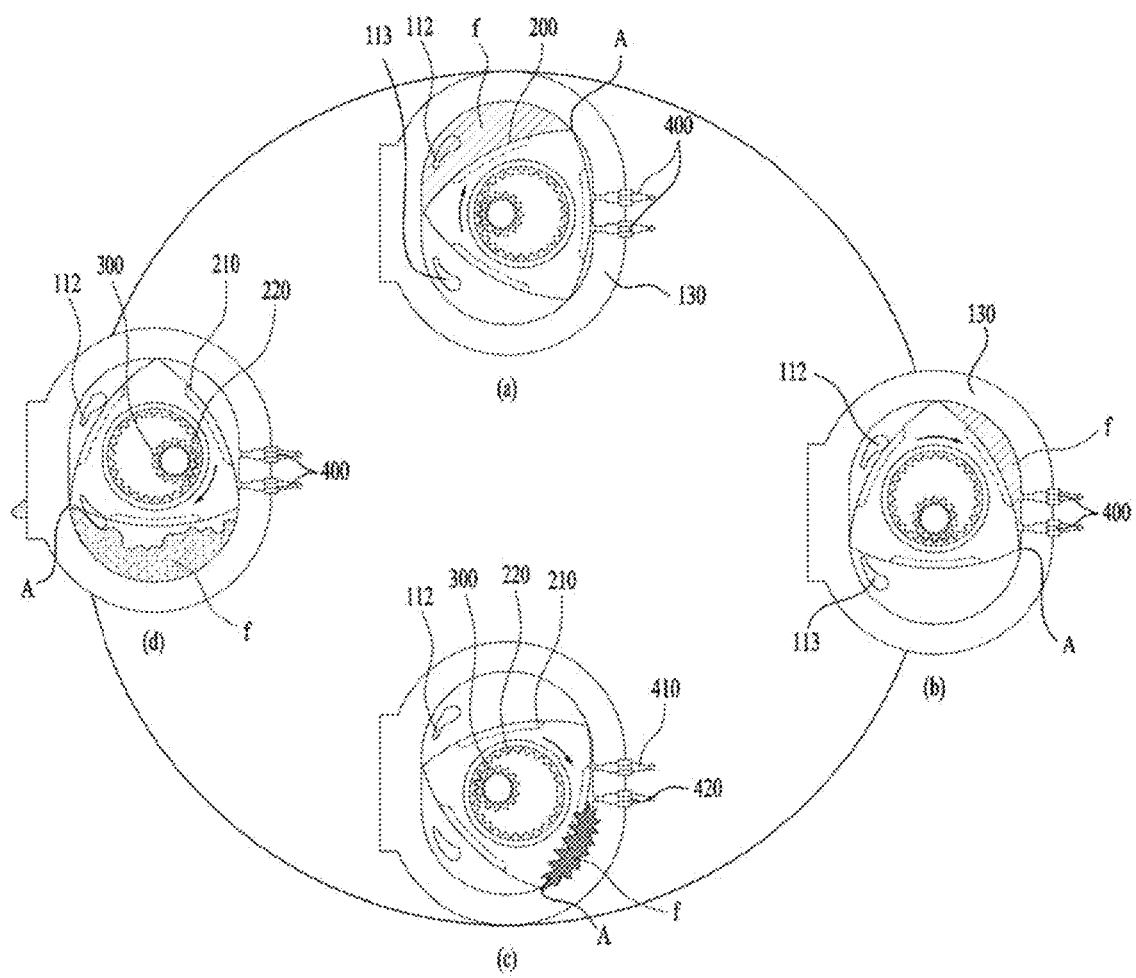
FIG. 7 illustrates an operation of the rotary engine according to an embodiment of the present disclosure.

The eccentric shaft 330 may eccentrically protrude to one side from the first shaft 310 and/or the second shaft 320. The eccentric shaft 320 may be received in the through hole 220 and configured to press a portion of the through hole 220 to push the outer circumferential surface 200 of the rotor 200 against the inner circumferential surface of the rotor housing 130 in the compression chamber 132. The eccentric shaft 330 may provide power to compress the fuel. The outer circumferential surface of the eccentric shaft 320 may be provided with an outer circumferential gear capable of engaging with the inner circumferential gear 225 of the through hole 220 (FIG. 7).

The first corner A, the second corner B, and the third corner C may be moved in surface contact with the rotor housing 130 for sealing or space division. The first corner A, the second corner B, and the third corner C may cause severe friction against the rotor housing 130. In addition, when the fuel explodes or combusts, the corners A, B, and/or C may be exposed to high temperatures and need to be lubricated. Accordingly, the rotary engine of the present disclosure may further include an oil supplier 500 configured to supply a lubricating oil to lubricate the contact surfaces (at or near the corners A, B, and/or C) of the rotor 200 and the rotor housing 130.

The oil supplier 500 may be provided in the housing 100 to supply the lubricating oil to the rotor 200. The oil supplier 500 may include a supply flow passage 570 provided in the housing 100 to allow the lubricating oil to move therethrough, a sealing part or seal 530 arranged to contact the rotor 200 to selectively close the supply flow passage 570, and an elastic member or spring 520 configured to press the sealing part 530 toward the combustion chamber 232. The seal 530 may also be referred to as a plug or oil plug. The elastic member 520 may be, for example, a coil spring or accordion spring, but embodiments disclosed herein are not limited.

The supply flow passage 570 may be formed through the interior of the housing 100. As a result, the volume of the oil supplier 500 may be reduced as compared to a case where the supply flow passage 570 is exposed to the outside, and the oil supplier 500 may be prevented from being damaged.

The elastic member 520 or the sealing part 530 may be inserted into the supply flow passage 570. A coupling hole 580 may be provided in the housing 100 to facilitate installation and repair of the sealing part 530 or the elastic member 520. The coupling hole 580 may be provided in each housing (110, 120, etc.) provided with the supply flow passage 570. The coupling hole 580 may be formed through the housing 100 to communicate with the supply flow passage 570. The oil supplier 500 may further include a support or plug 510 configured to close the coupling hole 580 and support the elastic member 520 when the insertion of the sealing part 530 and the elastic member 520 into the coupling hole 580 is completed. The support 510 may not only prevent the elastic member 520 or the sealing part 530 from being separated from the housing 100, but also block the supply flow passage 570 from being exposed to the outside, thereby preventing the lubricating oil or the fuel from leaking.

The oil supplier 500 may be provided in one or more of the first housing 110 and the second housing 120 to lubricate the outer circumferential surface or the first, second, and third compression surfaces 211, 212, and 213 of the rotor 200. The lubricating oil may be supplied to the entire outer circumferential surface of the rotor 200, as compared to a case where the oil supplier 500 is provided in the rotor housing 130. Accordingly, a smaller number of rotary engines of the present disclosure may be provided than in the case where the oil supplier 500 is provided in the rotor housing 130. Therefore, installation cost may be reduced and the structure may be simplified.

In order to minimize or reduce a volume of the oil supplier 500, the supply flow passage 570 may be provided inside the housing 100. The supply flow passage 570 may be arranged along an inner wall of one or more of the first housing 110 and the second housing 120. As a result, the entire volume of the rotary engine may be reduced because the supply flow passage 570 is not exposed to the outside. Further, even when the rotor 200 rotates at a high speed, the supply flow passage 570 may be prevented from being damaged or deformed. The supply flow passage 570 may communicate with an oil reservoir, which may be provided outside the housing 100 or coupled to the outer surface of the housing 100, so as to be supplied with oil.

The sealing part 530 may be arranged inside the supply flow passage 570 such that an end thereof may contact the rotor 200. When spaced apart from the rotor 200, the sealing part 530 may be arranged to close the supply flow passage 570. When in contact with the rotor 200, the sealing part 530 may be arranged to open the supply flow passage 570. Thus, as the rotor 200 and the sealing part 530 more frequently come into contact with each other, more oil may be supplied as the supply flow passage 570 is opened. As a result, the supply amount of oil may be adjusted without a separate electronic device for controlling the supply amount of oil.

Figure 3:
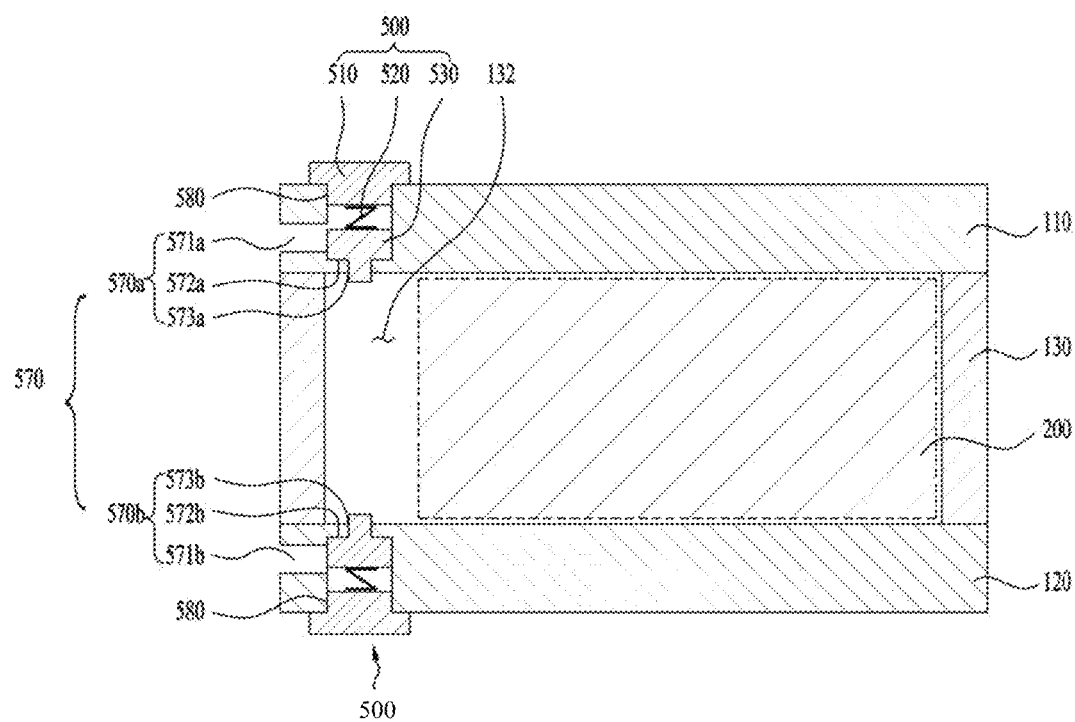
FIG. 3 shows a structure of an oil supplier according to an embodiment of the present disclosure.

FIG. 3 shows the structure of the oil supplier 500 according to an embodiment of the present disclosure. Referring to FIGS. 3 and 4, the supply flow passage 570 may include a transport flow passage 571 provided in at least one of the first housing 110 or the second housing 120 to allow the lubricating oil to move therethrough, and an inflow hole 573 formed through the at least one of the first housing 100 or the second housing 200 to allow the transport flow passage 571 and the combustion chamber 132 to communicate with each other.

The transport flow passage 571 may extend in a width direction (e.g., left-right direction) of the first housing 110 or the second housing 120, and the inflow hole 573 may extend in a direction corresponding to the thickness of the first housing 110 or the second housing 120. Accordingly, the lubricating oil may be introduced into the transport flow passage 571 and discharged into the inflow hole 573.

The supply flow passage 570 may be provided in only one of the first housing 110 and the second housing 120 or in both the first housing 110 and the second housing 120. When the supply flow passage 570 is provided in both the first housing 110 and the second housing 120, the supply flow passage 570 may include a first supply flow passage 570a provided in the first housing 110 and a second supply flow passage 570b provided in the second housing 120. Accordingly, the lubricating oil may be smoothly supplied in both directions of the rotor 200.

The first supply flow passage 570a may include a first transport flow passage 571a formed through the first housing 110 to communicate with an oil supply source coupled to an outer surface of the housing 100 or provided in the housing 100, and a first inflow hole 573a extending from the first transport flow passage 571a to the combustion chamber 132 in a communicating manner. The first inflow hole 573a may be formed through the inner surface of the first housing 110 to allow the combustion chamber 132 and the first supply flow passage 570a to communicate with each other.

The second supply flow passage 570b may include a second transport flow passage 571b formed through the second housing 120 to communicate with the oil supply source coupled to the outer surface of the housing 100 or provided in the housing 100, and a second inflow hole 573b extending from the second transport flow passage 571b to the combustion chamber 132 in a communicating manner. The second inflow hole 573b may be formed through the inner surface of the second housing 120 to allow the combustion chamber 132 and the second supply flow passage 570b to communicate with each other.

The sealing part 530 may be inserted into the inflow hole 573 to close the inflow hole 573. The sealing part 530 may be configured to open the inflow hole 573 when contacting the rotor 200. The sealing part 530 is kept pressed by the elastic member 520 at normal times to make close contact with the inflow hole 573 to seal the inflow hole 573. However, when the rotor 200 pushes the sealing part 530 to the outside of the housing 100, the sealing part 530 opens the inflow hole 573. When the rotor 200 is spaced apart from the sealing part 530, the elastic member 520 pushes the sealing part 530 back to the inflow hole 573 to seal the inflow hole 573.

The supply flow passage 570 may further include an inflow passage 572 formed to have a larger diameter than the inflow hole 573 to allow the inflow hole and the transport flow passage to communicate with each other. The inflow passage 572 may not only allow the supply flow passage 570 to communicate with the inflow hole 573 but also communicate with the coupling hole 580. Thereby, the sealing part 530 may be accommodated or received in the inflow passage 572. One end of the inflow passage 572 may communicate with the coupling hole 580, and the opposite end of the inflow passage 572 may communicate with the inflow hole 573.

The sealing part 530 may include a contact portion or projection 533 inserted into the inflow hole 573 to contact the rotor 200, and a sealing body 531 extending from the contact portion 533 to contact one end of the inflow hole 573, the sealing body 531 being wider than a diameter of the inflow hole 573. The contact portion 533 may be formed to have a diameter corresponding to the diameter of the inflow hole 573 to close the inflow hole 573. In addition, the contact portion 533 may be formed to be longer than the thickness of the inflow hole 573. Thus, the free or projecting end of the contact portion 533 may be exposed to the interior of the combustion chamber 132.

The sealing body 531 may be formed to be larger than the diameter of the inflow hole 573, and the sealing part 530 may be prevented from being completely separated into the combustion chamber 132 through the inflow hole 573. In addition, as the sealing body 531 is pressed by the elastic member 520, the sealing body 531 may be brought into close contact with an end of the inflow passage 572 to close an end of the inflow hole 573. Therefore, the inflow hole 573 may be primarily closed by the contact portion 533, and secondarily closed by the sealing body 531.

When the sealing body 531 seals the inflow hole 573, the sealing body 531 may also seal the transport flow passage 571. A thickness of the sealing body 531 may correspond to a spacing between the end of the inflow hole 573 and an outermost circumferential surface defining the transport flow passage 571. When the sealing part 530 closes the inflow hole 573, the transport flow passage 571 may also be closed to completely block the oil supply.

The contact portion 533 may have a diameter smaller than the diameter of the inflow hole 573 to allow the sealing part 530 to smoothly reciprocate in the inflow passage 572. In such a case, the sealing body 531 may seal the inflow hole 573.

The sealing part 530 may be provided in the first supply flow passage 570a and the second supply flow passage 570b, respectively, to selectively open and close the first inflow hole 573a and the second inflow hole 573b. When the rotor 200 rotates and comes into contact with the sealing part 530, the sealing part 530 may move from the combustion chamber 132 to open both the first inflow hole 573a and the second inflow hole 573b. Accordingly, the oil supplied through the transport flow passage 571 and the inflow passage 572 may be discharged to the first inflow hole 573a and the second inflow hole 573b.

The first inflow hole 573a and the second inflow hole 573b may be arranged to face each other, or alternatively may be misaligned with each other. While it illustrated in FIG. 3 that the supply flow passage 570 is provided in both the first housing 110 and the second housing 120, and the sealing part 530 is also provided in both the first housing 110 and the second housing 120, alternatively, the supply flow passage 570 and the sealing part 530 may be provided in only the first housing 110 or the second housing 120 based on the same principle.

Figure 4A:
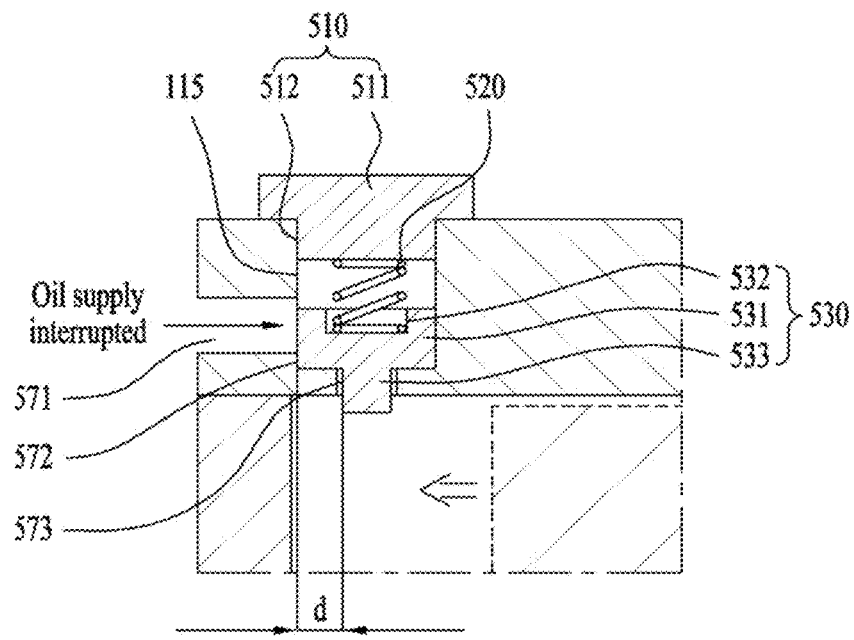
FIGS. 4A and 4B illustrate an operation of the oil supplier according to an embodiment of the present disclosure.
Figure 4B:
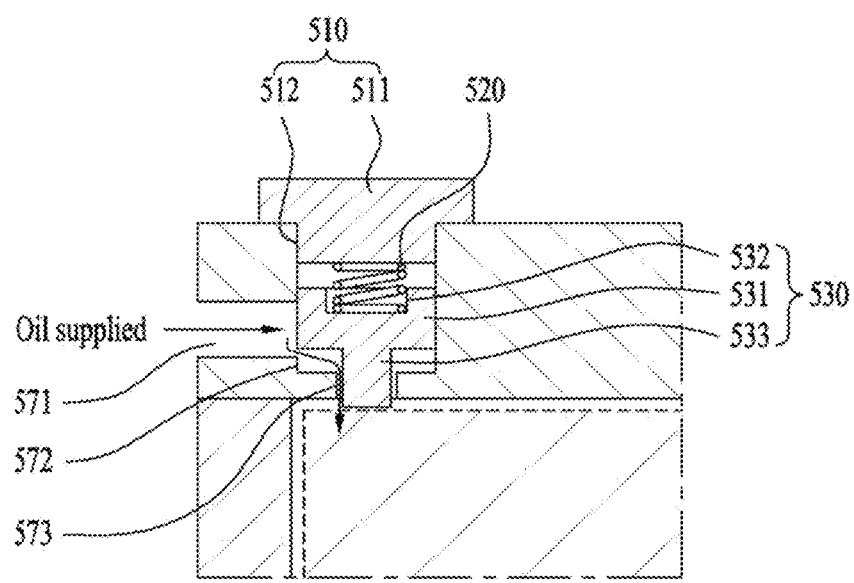

FIGS. 4A and 4B show enlarged views of the sealing part 530 and an operation thereof. Referring to FIG. 4A, the rotor 200 and the sealing part 530 may be arranged to be spaced apart from each other.

The sealing body 531 may have a larger diameter than the contact portion 533. As the diameter of the sealing body 531 increases, the inflow hole 573 may be shielded and/or closed more effectively. However, when the sealing part 530 is small, a difference in diameter between the sealing body 531 and the contact portion 533 may not be significant.

When the difference in diameter between the sealing body 531 and the contact portion 533 is smaller than an oil film that the lubricating oil may form, the inflow hole 573 may not be sealed even if the sealing body 531 is in close contact with the inflow hole 573. Accordingly, the supply of oil may be continued through the inflow hole 573.

To solve this problem, a distance d between the outermost surface or the outer circumferential surface of the sealing body 531 and the outer circumferential surface of the contact portion 533 may need to be longer than a thickness of the oil film formed by the lubricating oil. For example, the distance d may be greater than or equal to 2 mm.

The sealing part 530 may include an elastic coupling portion or recess 532 configured to accommodate or receive an end of the elastic member 520 opposite to an end coupled to the support 510. The elastic coupling portion 532 may be depressed in the sealing body 531 to partially accommodate the opposite end of the elastic member 520. A tensile force or compressive force of the elastic member 520 may be evenly transmitted to the sealing body 531, and the sealing part 530 may be prevented from being tilted inside the supply flow passage 570.

The support 510 may include an insertion portion or protrusion 512 inserted into the coupling hole 580 and a support member or body 511 formed to be larger than a diameter of the coupling hole 580 and seated on an outer surface of the at least one of the first housing 110 or the second housing 120.

The support 510 may be fixed to the outer surface of the housing 100 through the support member 511, and accordingly the insertion portion 512 may be prevented from being completely introduced into or filling the supply flow passage 570. The insertion portion 512 may be press-fitted or screwed to the coupling hole 580, and accordingly leakage through the coupling hole 580 may be prevented. In addition, the support 510 may be prevented from being separated even when the support 510 is subjected to compressive force or tensile force while supporting the end of the elastic member 520.

In FIG. 4A, the rotor 200 may be spaced apart from the sealing part 530. One end of the elastic member 520 may be supported by the insertion portion 512, and the opposite end thereof may be in contact with the sealing body 531. Here, the elastic member 520 may be arranged in a first or slightly compressed state (or alternatively, in a neutral or natural state), and the sealing body 531 may apply pressure toward the inflow hole 573. Accordingly, the contact portion 533 may be inserted into the inflow hole 573 and exposed to the combustion chamber 132. The oil flowing into the transport flow passage 571 may be blocked by the sealing body 531 and the contact portion 533.

Referring to FIG. 4B, when the rotor 200 rotates and comes into contact with the contact portion 533, the contact portion 533 may move toward the support 510. The sealing body 531 may be spaced apart from the inflow hole 573. As a result, the oil accommodated in the transport flow passage 571 may be supplied to one surface of the rotor 200 via the inflow passage 572 and the inflow hole 573. At this time, the elastic member 520 may be further compressed into a second compressed state, and may thus provide force in a direction that pushes the sealing part 530 toward the rotor 200.

When the rotor 200 is spaced apart from the sealing part 530 again, the sealing part 530 may be returned to the state of FIG. 4(a) by a restoring force of the elastic member 520.

Figure 5A:
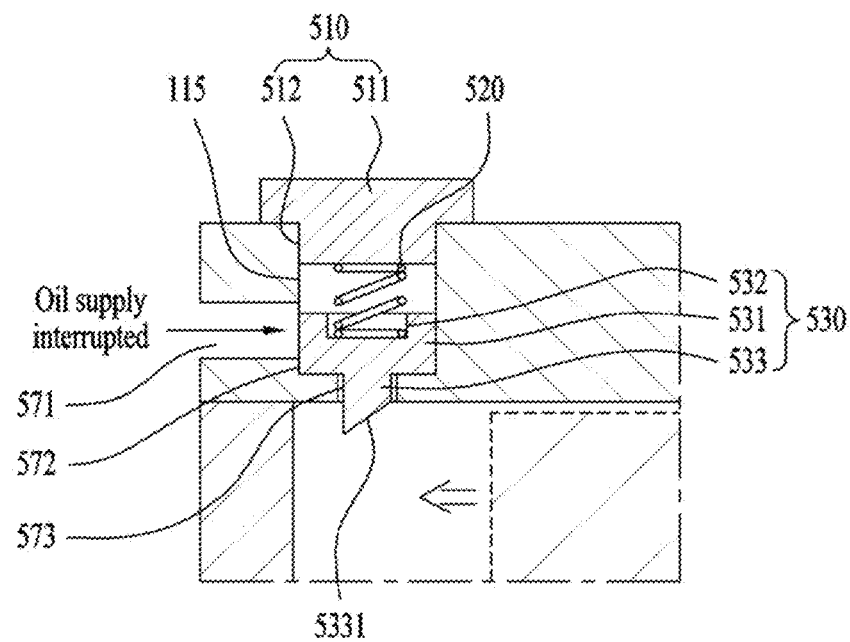
FIGS. 5A and 5B show another embodiment of the oil supplier according to the present disclosure.
Figure 5B:
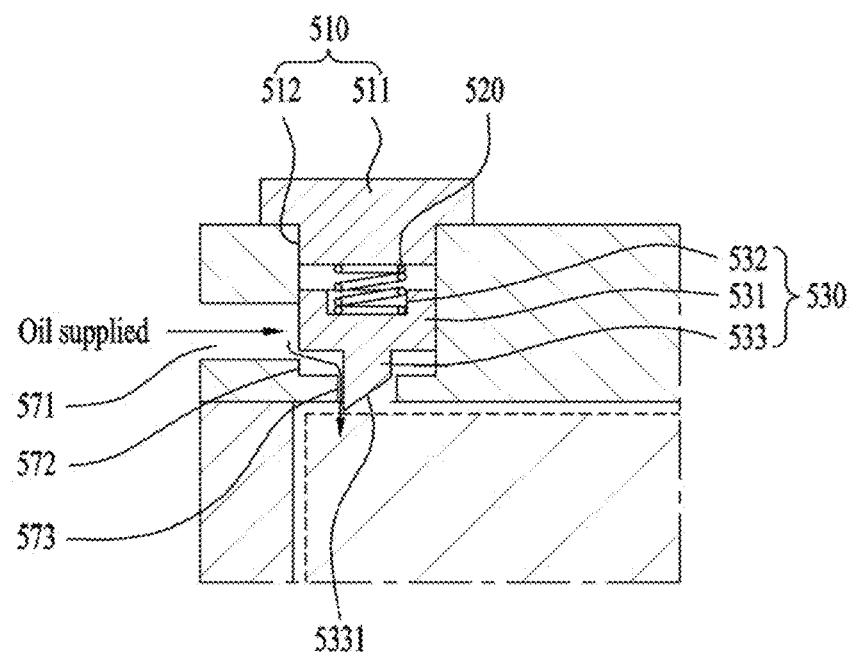

FIGS. 5A and 5B show another embodiment of the sealing part 530 having a guide or inclined surface 5331. Referring to FIG. 5A, since the rotor 200 rotates in one direction, a surface repeatedly contacting the contact portion 533 may be the same for each rotation. When a portion of the contact portion 533 that starts to come into contact with the rotor 200 is parallel to the compression surface of the rotor 200, the contact portion 533 may obstruct movement of the rotor 200 when pressed by the rotor 200 because the contact portion 533 fails to move toward the support 510. In a worse case, the contact portion 533 may be broken.

The contact portion 533 of the rotary engine of the present disclosure may include a guide or inclined surface 5331 configured to generate normal force to raise the contact portion 533 toward the elastic member 520 when pressed by the rotor 200. The guide surface 5331 may be a surface of the contact portion 533 that faces the rotor 200 and formed to be slanted or alternatively curved.

The guide surface 5331 may be configured such that a surface coming into contact with the rotor 200 first has a slope or curve with respect to the compression surface (211, 212, or 213). The guide surface 5531 may have a curvature that makes the guide surface 5531 convex toward the outside of the contact portion 533.

In FIG. 5A, the contact portion 533 and the rotor 200 may be spaced apart from each other. Referring to FIG. 5B, the rotor 200 may approach the contact portion 533 and contact the guide surface 531 to press the guide surface 5331. The guide surface 5531 may generate normal force that moves the contact portion 533 toward the elastic member 520.

Figure 6:
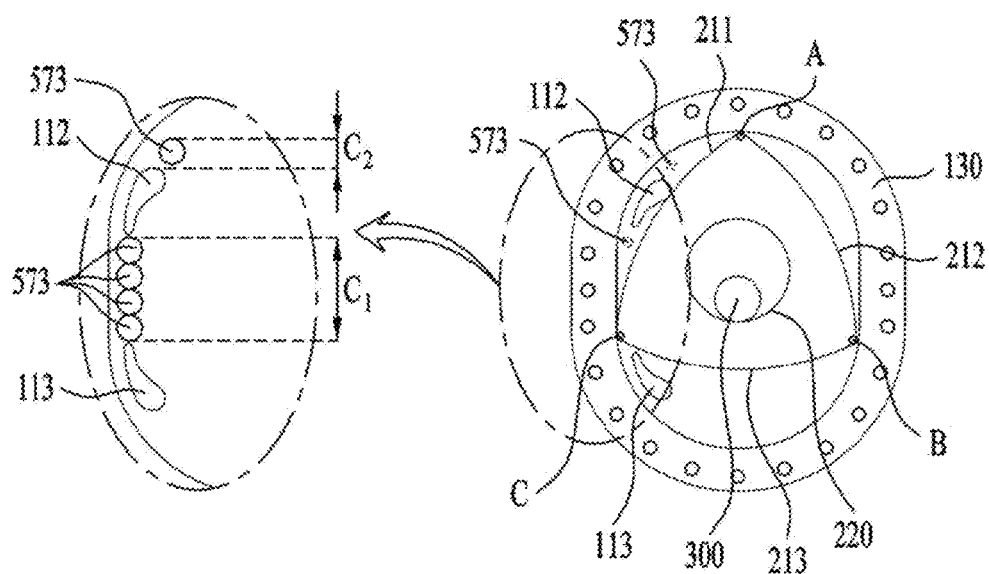
FIG. 6 shows an installation position of the oil supplier according to an embodiment of the present disclosure.

FIG. 6 shows where the oil supplier 500 of the present disclosure is provided. Referring to FIG. 6, since the inner circumferential surface of the rotor housing 130 may cause friction against the compression surface (211, 212, or 213)

of the rotor 200, the oil supplier 500 may be provided at a portion corresponding to the inner circumferential surface of the rotor housing 130.

In addition, since the outer circumferential surface of the rotor 200 and the inner circumferential surface of the rotor housing 130 may be lubricated, the oil supplier 500 may be provided in an area where the outer circumferential surface of the rotor 200 is exposed. Accordingly, the oil supplier 500 may be arranged along the inner circumferential surface of the rotor housing 130.

However, as described above, the housing 100 may include intake holes 112 and 122 configured to suck or suction the fuel, and exhaust holes 113 and 123 configured to discharge an oxide of the fuel. Here, the intake holes 112 and 122 and the exhaust holes 113 and 123 may be arranged to be biased or oriented toward the inner circumferential surface of the rotor housing 130. Further, the exhaust holes 113 and 123 may be located near the intake holes 112 and 122 such that the fuel is discharged after the rotor 200 completes almost one rotation in the rotor housing 130.

The intake holes 112 and 122 may be spaced apart from the exhaust holes 113 and 123 by a predetermined gap C1 to prevent or reduce a possibility of fuel mixture being mixed with oxidized fuel. The gap C1 may be a portion close to the inner circumferential surface of the rotor housing 130, and may correspond to a portion against which the corners A, B, and C of the rotor 200 cause friction.

The oil supplier 500 may be provided in the gap C1. The inflow hole 573 may be provided in the gap C1 and, as previously described, the sealing part 530 may selectively close the inflow hole 53. If the inflow hole 537 of the oil supplier 500 is arranged to face the intake holes 112 and 122 rather than the gap C1, the supplied oil may be discharged into the intake holes 112 and 122 and lost, or may be mixed with the fuel flowing into the intake holes 112 and 122 and oxidized with the fuel before it comes into contact with the rotor 200. If the inflow hole 537 of the oil supplier 500 is arranged to face the exhaust holes 113 and 123, the supplied oil may leak together with oxidized fuel into the exhaust holes 113 and 123.

It may be difficult to arrange the oil supplier 500 at a position on the inner circumferential surface of the rotor housing 130 that is spaced apart by a large enough distance from the intake holes 112 and 122 in the rotational direction of the rotor 200. As the distance of spacing from the intake holes 112 and 122 in the rotational direction of the rotor 200 increases, the fuel may be compressed or combusted to reach a high temperature. When the oil is supplied to the aforementioned region, the oil may be oxidized, and thus the combustion efficiency and the lubrication rate may be significantly lowered.

However, the temperature or pressure of the fuel at a portion spaced apart from the intake holes 112 and 122 by a predetermined distance away from the exhaust holes 113 and 123 may be relatively low. Accordingly, the inflow hole 573 of the oil supplier 500 may be arranged at a position spaced apart from the intake holes 112 and 122 by a predetermined distance away from the exhaust holes 113 and 123 in a gap C2 having a predetermined length. The predetermined length of the gap C2 may be shorter than the gap C1.

In particular, since the igniter 400, which is coupled to one side of the housing 100 to ignite the fuel, is arranged at a position where the intake holes 112 and 122 face the exhaust holes 113 and 123, the oil supplier 500 may be provided at a position facing the igniter 400. A position facing the igniter 400 may be a region with a lower or the lowest temperature, and combustion of the oil may be prevented or reduced at this position.

FIG. 7 illustrates an operation of the rotary engine according to the present disclosure.

Referring to FIG. 7, view or step (a), an intake stroke in which fuel f is sucked or suctioned through the intake holes 112 and 122 is performed. Referring to FIG. 7, view or step (b), when the rotor 200 is rotated in the intake stroke, the fuel f may move along the corner A of the rotor 200 and a compression stroke in which the fuel is compressed in close contact with the rotor housing 130 is performed. Referring to FIG. 7, view or step (c), an explosion or combustion stroke is performed in which the fuel compressed in the compression stroke is exploded or combusted by a spark generated by the igniter 400 and the volume thereof starts to increase explosively. Referring to FIG. 7, view or step (d), an exhaust stroke is performed in which the rotor 200 rotates at a high speed due to the repulsive force from the explosion stroke to discharge the oxide of the fuel f into the exhaust holes 113 and 123. Accordingly, the intake stroke is performed again while the rotor 200 rotates due to inertia.

As a result, in the rotary engine of the present disclosure, all the above-described strokes may be performed in one rotation, and the above-described process may be continuously performed. As is apparent from the above description, the present disclosure has effects as follows.

A structure according to the present disclosure may be installed in both side housings of a rotary engine, and accordingly may not be limited by the space where the engine is installed. According to embodiments of the present disclosure, maintenance of an oil supply device may be facilitated. According to embodiments of the present disclosure, the oil supply flow rate may naturally increase when the revolutions per minute of the engine increases. According to embodiments of the present disclosure, parts to control the oil flow rate may be omitted.

Accordingly, the present disclosure may be directed to a rotary engine that substantially obviates one or more problems due to limitations and disadvantages of the related art.

An object of the present disclosure is to minimize a volume of a device that supplies lubricating oil to a rotary engine. Another object of the present disclosure may be to provide a rotary engine capable of directly supplying lubricating oil to a rotor.

Another object of the present disclosure may be to provide a rotary engine capable of blocking lubricating oil from being supplied when spaced apart from a rotor and allowing the lubricating oil to be supplied when bought into contact with the rotor. Another object of the present disclosure may be to provide a rotary engine capable of increasing an amount of lubricating oil supplied when the number of rotations of a rotor increases and decreasing the amount of lubricating oil supplied when the number of rotations of the rotor decreases. Another object of the present disclosure may be to provide a rotary engine equipped with an oil supply control device that may be automatically opened and closed by a rotor.

Additional advantages, objects, and features of the disclosure are set forth in part in the description and in part will become apparent to those having ordinary skill in the art upon examination of the disclosure or may be learned from practice of the disclosure. The objectives and other advantages of the disclosure may be realized and attained by the structure particularly pointed out in the written description and claims hereof as well as the appended drawings.

To achieve these objects and other advantages and in accordance with the purpose of the disclosure, as embodied and broadly described herein, an oil supply device may include an oil plug configured to control a supply flow rate of oil, an elastic part or member configured to control operation of the plug, and a support member or support configured to support the elastic member.

The oil supply device may be positioned on a trajectory of a corner seal arranged on a rotor. The oil supply device may be positioned at a terminal end of an exhaust port.

The oil supply device may supply the oil only when the oil plug and a seal or corner of the rotor contact each other. Accordingly, when the engine speed increases, the supply flow rate of the oil may naturally increase.

The oil supply device may include an oil plug configured to reciprocate to open and close an oil supply flow passage when contact with a rotor seal or corner is made according to rotation of the rotor, an elastic member configured to move the oil plug to close the oil supply flow passage when the contact with the rotor seal is not made, and a support member configured to support the elastic member at a rear end of the elastic member.

The oil supply device may be positioned on the trajectory of the corner seal of the rotor. The oil supply device may be provided to supply oil when the oil plug of the oil supply device and the corner seal (including some side seal or compression surface trajectories) arranged on the rotor contact each other.

The position of an oil discharge port of the oil supply device may be limited to an initial stroke section of the engine (the section between the exhaust port and the intake port) and an initial section of a compression stroke. The discharge pressure of the oil may be about 4 to 6 bar based on the rotary engine. When the compression stroke is performed, the pressure inside a stroke or compression chamber may be higher than the oil discharge pressure, and thus oil may not be discharged, but rather the mixture (of fuel and air) inside the stroke chamber may be introduced into the oil passage. In addition, in the section where the combustion stroke occurs, the oil is likely to be carbonized by the high temperature as well as the discharge pressure.

Lastly, like the combustion stroke section, the expansion stroke section may have a risk of oil carbonization due to high temperature, and thus may not allow formation of an oil outlet.

The oil supply device of the present disclosure may allow oil to be supplied only when the oil plug and the seal or corner of the rotor contact each other. Accordingly, when the engine speed increases, the oil supply flow rate may naturally increase. In general, the flow rate of the oil supplied to lubricate or cool the seal parts inside the engine may be increased as the engine speed increases. To this end, a rotary engine according to the related art may use a metering oil pump to control the flow rate of the supplied oil according to the number of revolutions, which may lead to an increase in manufacturing costs due to an increase in the number of parts and raise an issue according to an increase in parts to be managed. On the other hand, embodiments disclosed herein do not require a separate flow control component.

The oil supply device may be designed to supply oil when the oil plug and the corner seal of the rotor (including some side seal trajectories) contact each other. The corner seal of the rotor may be provided at the corners of the three vertices or edges of the rotor having a triangular shape. Accordingly, the oil may be supplied three times every time the rotor completes one rotation. In view of this, when the number of revolutions of the engine increases, the number of times of contact between the oil plug and the rotor also increases, and thus the oil supply flow rate may be naturally increased.

Embodiments disclosed herein may be implemented as a rotary engine comprising a housing having a chamber in which a fuel is provided and a supply flow passage through which lubricating oil flows, a rotor provided in the chamber and configured to be rotated to compress the provided fuel, and an oil supplier provided in the housing to supply a lubricating oil to the supply flow passage. The oil supplier may include a plug or seal configured to contact a portion of the rotor to selectively close the supply flow passage and an elastic member or spring configured to press the plug in a first direction toward the chamber when in a compressed state.

The housing may comprise a rotor housing having a side surface configured to be in contact with at least one edge of the rotor, the side surface defining an inner side surface of the chamber, a first housing coupled to the rotor housing and defining a first side of the chamber, and a second housing coupled to the rotor housing and defining a second side of the chamber, the second side being opposite to the first side. The supply flow passage may be provided in the first housing.

The supply flow passage may comprise a flow passage provided in the first housing through which lubricating oil is provided and an inflow hole formed through the first housing and communicating with the transport flow passage. The plug may be inserted in the inflow hole such that, when the rotor contacts the plug, the plug is moved in a second direction in the inflow hole to open the inflow hole, the second direction being opposite to the first direction. When the rotor does not contact the plug, the plug may be moved in the first direction in the inflow hole via a restoring force of the elastic member to close the inflow hole.

The supply flow passage may further include an inflow passage formed to have a larger diameter than a diameter of the inflow hole to allow the inflow hole and the flow passage to communicate with each other. The plug may include a contact projection inserted into the inflow hole to contact the rotor and a sealing body extending from the contact projection in the second direction, the sealing body having a diameter larger than the diameter of the inflow hole.

A distance between an outer circumferential surface of the sealing body and an outer circumferential surface of the contact projection may be greater than a thickness of an oil film formable by the lubricating oil. The contact projection may have a diameter that is less than the diameter of the inflow hole. The contact projection may include a guide surface having a shape configured to allow rotation of the rotor past the contact projection such that, when the rotor contacts the guide surface, the contact projection is moved in the second direction.

The plug may include an elastic coupling recess configured to receive a first end of the elastic member. A coupling hole may be formed through the first housing to communicate with the supply flow passage. The oil supplier may include a support coupled to the coupling hole to support a second end of the elastic member that is opposite to the first end. The support may include an insertion projection, which is configured to be inserted into the coupling hole, and a support body having a diameter larger than a diameter of the coupling hole and seated on an outer surface of the first housing.

Another supply flow passage may be provided in the second housing. The oil supplier may be provided in both the first housing and the second housing.

The housing may comprise an intake hole configured to suction the fuel and an exhaust hole configured to discharge an oxide of the fuel. The oil supplier may be arranged between the intake hole and the exhaust hole. The housing may comprise an intake hole configured to suction the fuel and an exhaust hole configured to discharge an oxide of the fuel. The oil supplier may be spaced apart from the intake hole in a direction away from the exhaust hole. The oil supplier may be spaced apart from the intake hole by a distance shorter than a distance between the intake hole and the exhaust hole.

An igniter may be coupled to a side of the housing to ignite the provided fuel. The oil supplier may be arranged at a position facing the igniter.

Embodiments disclosed herein may be implemented as a rotary engine comprising a housing having at least one inner surface defining a chamber, the chamber being configured to receive fuel, a flow passage in which a lubricating oil is provided, and an inflow passage communicating with the flow passage; a rotor provided in the chamber, the rotor having at least one edge configured to contact the inner surface of the housing such that, when the rotor rotates inside of the chamber, the fuel provided in the chamber is compressed; and an oil supplier provided in the housing to supply the lubricating oil to the flow passage. The oil supplier may include a plug configured to move within the inflow passage in a first direction toward the chamber and a second direction away from the chamber, and an elastic member coupled to the plug. When the rotor contacts the plug, the elastic member may be compressed, and a restoring force of the elastic member may be in the first direction.

The housing may include an inflow hole provided between the inflow passage and the chamber so as to communicate with the inflow passage and the chamber, the inflow hole having a cross-sectional area that is less than a cross-sectional area of the inflow passage. The plug may include a body and a projection extending from the body in the first direction, the body having a cross-sectional area and shape corresponding to the cross-sectional area and shape of the inflow passage, and the projection having a cross-sectional area less than the cross-sectional area of the inflow hole. When the edge of the rotor contacts the end of the projection, the plug may be moved in the second direction such that the flow passage communicates with the chamber via the inflow hole and intake passage. When the rotor rotates such that the edge is moved past the projection, the plug may be moved in the first direction by the restoring force of the elastic member, an end of the projection may be provided in the chamber, and the body of the plug may block lubricating oil from entering the inflow passage.

Embodiments disclosed herein may be implemented as a rotary engine comprising a housing, a rotor, and an oil supplier. The housing may have at least one fuel intake, a chamber communicating with the fuel intake, at least one exhaust port communicating with the chamber to exhaust fuel, and a supply passage configured to communicate with the chamber at a position between positions where the fuel intake and exhaust port communicate with the chamber. The rotor may have an edge configured to contact the housing and a surface configured to compress fuel when the rotor is rotated. The oil supplier may be provided in the housing to supply lubricating oil to the supply passage. The oil supplier may include a plug and an elastic member. The plug may be configured to move in a first direction to be partially inserted into the supply passage and the chamber to block communication of the chamber with the supply passage and a second direction opposite to the first direction to open communication between the chamber and the supply passage. The elastic member may be configured to be compressed in the second direction when the edge of the rotor contacts the plug and to exert a restoring force in the first direction on the plug strong enough to move the plug in the first direction when the rotor is rotated such that the surface faces the plug.

The rotor may have three edges and three surfaces such that, when one of the edges contacts the plug, lubricating oil is supplied to the rotor, and when one of the surfaces faces the plug, the rotor does not contact the plug such that lubricating oil is prevented from entering the chamber.

The supply passage may be stepped and the plug may be stepped such that, when the plug is moved in the first direction via the elastic member, the plug is seated in a stepped portion of the supply passage to block lubricating oil from entering the chamber, and when the plug is moved in the second direction via the rotor, lubricating oil supplied from the oil supplier flows between the stepped portion of the supply passage and a stepped portion of the plug to lubricate the edge of the rotor.

It is to be understood that both the general description and the detailed description of the present disclosure are exemplary and explanatory and are intended to provide further explanation of the disclosure as claimed. It will be apparent to those skilled in the art that various modifications and variations can be made in the present disclosure without departing from the spirit and scope of the disclosure. Thus, it is intended that the present disclosure cover the modifications and variations of this disclosure provided they come within the scope of the appended claims and their equivalents.

Exemplary embodiments are described in detail with reference to the accompanying drawings. In the present specification, the same or similar reference numerals are assigned to the same or similar elements in different embodiments, and each of them will be described only once. As used herein, the singular forms "a", "an" and "the" include plural forms unless the context clearly indicates otherwise. In addition, in describing the embodiments disclosed herein, the detailed description of the related known technology may be omitted to avoid obscuring the gist of the embodiments. In addition, it should be noted that the accompanying drawings are merely provided to facilitate understanding of the embodiments disclosed in the present specification and are not to be construed as limiting the technical spirit disclosed in the present specification.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A rotary engine, comprising:
   a housing having a chamber in which a fuel is provided and a supply flow passage through which a lubricating oil supplied to the chamber flows;
   a rotor eccentrically and rotatably provided in the chamber and configured to be rotated to compress the provided fuel; and
   an oil supplier provided in the housing to supply the lubricating oil to the supply flow pas sage,
   wherein the oil supplier includes:
      a plug configured to contact a portion of the rotor to selectively close the supply flow passage by the eccentrical rotation of the rotor such that the plug is configured to open the supply flow passage when periodically contacting the rotor; and
      an elastic member configured to press the plug toward the chamber, and
   wherein the supply flow passage is stepped and the plug is stepped such that the plug is seated in a stepped portion of the supply passage to block lubricating oil from entering the chamber, and lubricating oil supplied from the oil supplier flows between the stepped portion of the supply passage and a stepped portion of the plug to lubricate the edge of the rotor.

2. The rotary engine of claim 1, wherein the housing comprises:
   a rotor housing having a side surface configured to be in contact with at least one surface of the rotor, the side surface defining an inner side surface of the chamber;
   a first housing coupled to the rotor housing and defining a first side of the chamber; and
   a second housing coupled to the rotor housing and defining a second side of the chamber, the second side being opposite to the first side, wherein the supply flow passage is provided in at least one of the first housing or the second housing.

3. The rotary engine of claim 2, wherein the supply flow passage comprises:
   a flow passage provided in at least one of the first housing or the second housing through which lubricating oil is provided; and
   an inflow hole formed through the at least one of the first housing or the second housing and communicating with the transport flow passage,
   wherein the plug is inserted in the inflow hole such that, when the rotor contacts the plug, the plug is moved to open the inflow hole.

4. The rotary engine of claim 3, wherein:
   the supply flow passage further includes an inflow passage formed to have a larger diameter than a diameter of the inflow hole to allow the inflow hole and the flow passage to communicate with each other, and
   the plug includes a contact projection inserted into the inflow hole to contact the rotor and a sealing body extending from the contact projection, the sealing body having a diameter larger than the diameter of the inflow hole.

5. The rotary engine of claim 4, wherein a distance between an outer circumferential surface of the sealing body and an outer circumferential surface of the contact projection is greater than a thickness of an oil film formable by the lubricating oil.

6. The rotary engine of claim 4, wherein the contact projection has a diameter that is less than the diameter of the inflow hole.

7. The rotary engine of claim 4, wherein the contact projection includes a guide surface configured to generate a normal force to move the contact projection toward the elastic member when contacting the rotor.

8. The rotary engine of claim 1, wherein the plug includes an elastic coupling recess configured to receive a first end of the elastic member.

9. The rotary engine of claim 2, further comprising a coupling hole formed through the first housing to communicate with the supply flow passage, wherein the oil supplier includes a support coupled to the coupling hole to support a second end of the elastic member that is opposite to the first end.

10. The rotary engine of claim 9, wherein the support includes an insertion projection, which is configured to be inserted into the coupling hole, and a support body having a diameter larger than a diameter of the coupling hole and seated on an outer surface of the first housing.

11. The rotary engine of claim 2, wherein the supply flow passage is provided in both the first housing and the second housing, and the oil supplier is provided in both the first housing and the second housing.

12. The rotary engine of claim 1, wherein the housing comprises:
an intake hole configured to suction the fuel; and
an exhaust hole configured to discharge an oxide of the fuel,
wherein the oil supplier is arranged between the intake hole and the exhaust hole.

13. The rotary engine of claim 1, wherein the housing comprises:
an intake hole configured to suction the fuel; and
an exhaust hole configured to discharge an oxide of the fuel, wherein the oil supplier is spaced apart from the intake hole in a direction away from the exhaust hole.

14. The rotary engine of claim 13, wherein the oil supplier is spaced apart from the intake hole by a distance shorter than a distance between the intake hole and the exhaust hole.

15. The rotary engine of claim 1, further comprising an igniter coupled to a side of the housing to ignite the provided fuel, wherein the oil supplier is arranged at a position opposite to the igniter.

16. A rotary engine, comprising:
a housing having at least one inner surface defining a chamber, the chamber being configured to receive fuel, a flow passage in which a lubricating oil is provided, and an inflow passage communicating with the flow passage;
a rotor eccentrically and rotatably provided in the chamber, the rotor having at least one edge configured to contact the inner surface of the housing such that, when the rotor rotates inside of the chamber, the fuel provided in the chamber is compressed; and
an oil supplier provided in the housing to supply the lubricating oil to the flow pas sage,
wherein the oil supplier includes:
a plug configured to move within the inflow passage in a first direction toward the chamber and a second direction away from the chamber by the eccentrical rotation of the rotor; and
an elastic member coupled to the plug, wherein, when the rotor contacts the plug, the elastic member is compressed, and a restoring force of the elastic member is in the first direction, and
wherein the flow passage is stepped and the plug is stepped such that the plug is seated in a stepped portion of the supply passage to block lubricating oil from entering the chamber, and lubricating oil supplied from the oil supplier flows between the stepped portion of the supply passage and a stepped portion of the plug to lubricate the edge of the rotor.

17. The rotary engine of claim 16, wherein:
the housing includes an inflow hole provided between the inflow passage and the chamber so as to communicate with the inflow passage and the chamber, the inflow hole having a cross-sectional area that is less than a cross-sectional area of the inflow passage,
the plug includes a body and a projection extending from the body in the first direction, the body having a cross-sectional area and shape corresponding to the cross-sectional area and shape of the inflow passage, and the projection having a cross-sectional area less than the cross-sectional area of the inflow hole,
when the edge of the rotor contacts the end of the projection, the plug is moved in the second direction such that the flow passage communicates with the chamber via the inflow hole and intake passage, and
when the rotor rotates such that the edge is moved past the projection, the plug is moved in the first direction by the restoring force of the elastic member, an end of the projection is provided in the chamber, and the body of the plug blocks lubricating oil from entering the inflow passage.

18. A rotary engine, comprising:
a housing having at least one fuel intake, a chamber communicating with the fuel intake, at least one exhaust port communicating with the chamber to exhaust fuel, and a supply passage configured to communicate with the chamber at a position between positions where the fuel intake and exhaust port communicate with the chamber;
a rotor eccentrically and rotatably provided in the chamber, the rotor having an edge configured to contact the housing and a surface configured to compress fuel when the rotor is rotated; and
an oil supplier provided in the housing to supply lubricating oil to the supply passage,
wherein the oil supplier includes:
a plug configured to move in a first direction to be partially inserted into the supply passage and the chamber to block communication of the chamber with the supply passage and a second direction opposite to the first direction to open communication between the chamber and the supply passage by the eccentrical rotation of the rotor, and
an elastic member configured to be compressed in the second direction when the edge of the rotor contacts the plug and to exert a restoring force in the first direction on the plug strong enough to move the plug in the first direction when the rotor is rotated such that the surface faces the plug, and
wherein the supply passage is stepped and the plug is stepped such that, when the plug is moved in the first direction via the elastic member, the plug is seated in a stepped portion of the supply passage to block lubricating oil from entering the chamber, and when the plug is moved in the second direction via the rotor, lubricating oil supplied from the oil supplier flows between the stepped portion of the supply passage and a stepped portion of the plug to lubricate the edge of the rotor.

19. The rotary engine of claim 18, wherein the rotor has three edges and three surfaces such that, when one of the edges contacts the plug, lubricating oil is supplied to the rotor, and when one of the surfaces faces the plug, the rotor does not contact the plug such that lubricating oil is prevented from entering the chamber.

* * * * *